(12) United States Patent
Han

(10) Patent No.: US 6,243,431 B1
(45) Date of Patent: Jun. 5, 2001

(54) SYMBOL TIMING RECOVERY APPARATUS

(75) Inventor: Dong-seog Han, Songtan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 08/268,460

(22) Filed: Jun. 30, 1994

(30) Foreign Application Priority Data

Jun. 30, 1993 (KR) .................................................. 93-12085

(51) Int. Cl.[7] ....................................................... H04L 7/02
(52) U.S. Cl. ............................................. 375/355; 375/360
(58) Field of Search .................................... 375/355, 360, 375/359, 222; 328/63, 72, 155; 327/78, 79, 129

(56) References Cited

U.S. PATENT DOCUMENTS

| | | | |
|---|---|---|---|
| 4,312,075 | * | 1/1982 | Murano et al. ...................... 375/355 |
| 4,808,937 | * | 2/1989 | Currea et al. ........................ 328/155 |
| 4,910,474 | * | 3/1990 | Tjahjadi et al. ...................... 375/355 |
| 5,001,729 | * | 3/1991 | Tjahjadi et al. ...................... 375/355 |
| 5,040,194 | * | 8/1991 | Tjahjadi et al. ...................... 375/317 |
| 5,311,178 | * | 5/1994 | Pan et al. .............................. 341/59 |

* cited by examiner

Primary Examiner—Tesfaldet Bocure
(74) Attorney, Agent, or Firm—Sughrue, Mion, Zinn, Macpeak & Seas, PLLC

(57) ABSTRACT

A symbol timing recovery apparatus recovers the symbol timing necessary for sampling a signal received in a receiver of a high-speed data transmission system such as a full-digital high-definition television. Pre-processing filters primarily determine a signal component necessary for recovering the symbol timing from the received signal. Square calculators, respectively corresponding to an I-channel and a Q-channel, square the outputs of the pre-processing filters. An adder adds the outputs of the square calculators. A narrow-band filter performs narrow-band filtering having a center frequency which matches a symbol rate with respect to the output of the adder. An average value detector calculates an average value of the positive-going zero-crossing point and determines a sampling point in time and a symbol timing interval. A clock generator uses the sampling point in time and the symbol timing interval and generates a sampling clock which is appropriate for an input signal. Thus, the symbol timing recovery apparatus can perform speedier and more exact symbol timing recovery.

16 Claims, 1 Drawing Sheet

SYMBOL TIMING RECOVERY APPARATUS

BACKGROUND OF THE INVENTION

The present invention relates to a symbol timing recovery apparatus, and more particularly to an apparatus for recovering a symbol timing of a signal received at a receiver for use in a high-definition television or a high-speed data modem.

A receiver for use in a general full-digital high-definition television receiver or a high-speed data modem performs recovery of a symbol rate or a symbol timing frequency, and tracking of a symbol timing during a signal processing. The signal received in the receiver of the high-definition television has considerable distortion due to non-ideal characteristics of a channel, a multi-channel and due to noise during transmission. On the other hand, in the high-speed data transmission system, a phenomenon of symbol timing drift can occur between a transmitter and a receiver. Here, the symbol timing drift means that the number of the symbols transmitted from the transmitter and the number of the symbols recovered in the receiver are different from each other. When the transmitter, which transmits the symbols in a certain symbol transmission period of time $T_1$, transmits the symbols in a slightly changed period of time $T_1+\Delta t$ due to instability in the circuitry of the transmitter, and when the receiver ignores the change of the symbol transmission period of time and samples the signals in a constant period of time $T_1$, or to the contrary, when the circuitry of the receiver which samples the signals is unstable, the phenomenon of the symbol timing drift occurs.

Such a distorted signal can be recovered to a degree through digital signal processes such as adaptive carrier recovery, adaptive equalization, etc., in high-definition television. However, such recovery of the received signal is possible only when the received symbol is sampled in the same interval and substantially same phase as those of the symbol transmitted from the transmitter. Therefore, in recovering the received signal in the receiver, it is crucial to find out an exact sampling point of time from the received signal.

Particularly, when the high-speed data transmission of about 6M symbols per second is accomplished and a separate carrier corresponding to the sampling frequency is not transmitted for the symbol timing recovery, as in the high-definition television, it is not only considerably difficult to find out an exact symbol timing using only the received signal, but also the circuitry for realizing the above exact symbol timing is complicated. Thus, it is required that an apparatus for recovering the symbol timing of the high-speed data modem using a simple structure is to be developed.

A symbol timing recovery circuit is disclosed in a Japanese laid-open publication no. J02070140A published on Mar. 9, 1990. When a bit rate of the demodulation data is lowered, this prior art reference discloses a technology for supplying the sampling clock corresponding to the lowered bit rate to an analog-to-digital converter in a digital demodulator. Referring to the above prior art reference, a phase difference between the demodulation data and the sampling clock is detected, and a high frequency clock supplied from a high frequency generator is divided according to the phase difference. The sampling clock is generated based on a high frequency clock which matches a bit rate of the demodulation data among the divided high frequency clocks.

Another prior art reference for recovering the symbol timing is disclosed in U.S. Pat. No. 5,208,839 which was issued on May 4, 1993. The above prior art reference discloses a symbol synchronizer which introduces a symbol clock reference using a clock which is produced out of the baseband signal which is sampled in various digital signal patterns which include non-return-to-zero (NRZ) and Manchester patterns.

U.S. Pat. No. 5,200,981 issued on Apr. 6, 1993 discloses a quadrature amplitude modulation (QAM) modem receiver. This modem receiver uses a sign which is obtained by twice differentiating the baseband signal and performing a locality decision with respect to whether the baseband signal is concave or convex. A global decision which is obtained by summing the locality decisions in a proper period of time is used for correction of the lead or lag of the timing.

SUMMARY OF THE INVENTION

Therefore, to improve a symbol timing recovery method which is used in a conventional low-speed modem, it is an object of the present invention to provide a symbol timing recovery apparatus having a simple hardware structure for effectively recovering the symbol timing of a received signal and solving the phenomenon of symbol timing drift in a high-speed data transmission system.

To accomplish the above object of the present invention, there is provided a symbol timing recovery apparatus for recovering a symbol timing to sample a signal which is received in a receiver of a high-speed data transmission system, the symbol timing apparatus comprising:

means for receiving the sampled signal and generating a sinusoidal wave for recovering the symbol timing; means for detecting a positive-going zero-crossing point of the sinusoidal wave which is supplied from the sinusoidal wave generating means; and means for generating a sampling clock to sample the received signal using the positive-going zero-crossing point.

DETAILED DESCRIPTION OF THE PREFERRED EMBODIMENT

A preferred embodiment of the present invention will be described below in more detail with reference to the accompanying drawings.

Figure 1:
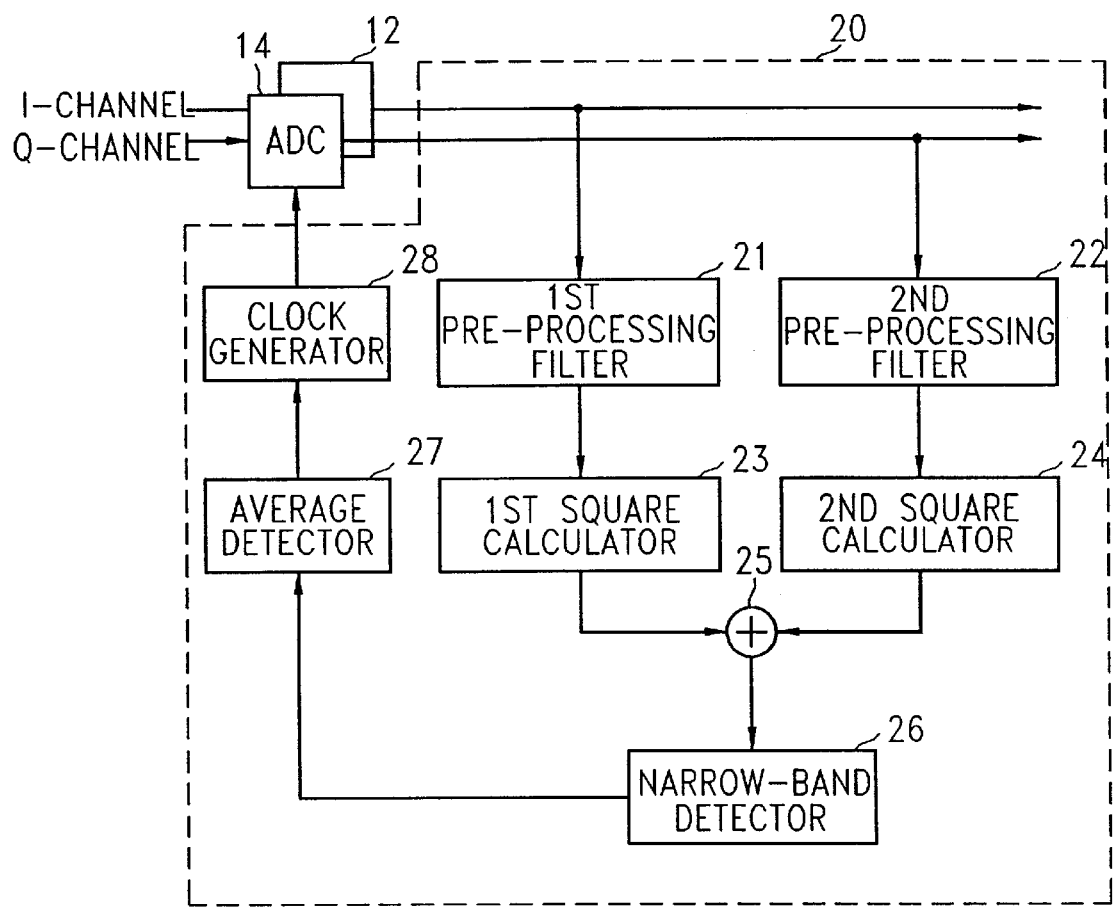
FIG. 1 is a block diagram of a symbol timing recovery apparatus according to one embodiment of the present invention.

The apparatus shown in FIG. 1 adopts a basic non-linear spectral line method which determines a period during which the signal level of the received signal changes. The non-linear spectral line method is disclosed in a paper entitled "Timing Recovery and Scramblers in Data Transmission" by R. D. Gitlin and J. F. Hayes, (Bell System Technical Journal, vol. 54, pp. 569–593, March 1975). Since the apparatus of FIG. 1 has a feedback loop structure, the symbol timing drift between the transmitter and the receiver as well as the symbol timing recovery can be solved with only a simple circuitry structure.

In FIG. 1, symbol timing recovery apparatus 20, according to the embodiment of the present invention, is connected to analog-to-digital converters 12 and 14, so as to receive the outputs of analog-to-digital converters 12 and 14. First and second pre-processing filters 21 and 22 in symbol timing recovery apparatus 20 receive the outputs of analog-todigital converters 12 and 14. The output of first pre-processing filter 21 is supplied to a first square calculator 23 and the output of second pre-processing filter 22 is supplied to a second square calculator 24. An adder 25 adds the outputs of square calculators 23 and 24 and outputs the summation signal to a narrow-band filter 26. An average detector 27 detects a positive-going zero-crossing point (PGZP) from the output of narrow-band filter 26 and averages the PGZP data. Average detector 27 uses the value of the averaged PGZP to calculate a sampling period. A clock generator 28 receives the output of average detector 27 and generates a sampling clock corresponding to the sampling period. Analog-to-digital converters 12 and 14 use the sampling clock to convert the analog signal into the digital signal.

A process for recovering a symbol timing from a symbol sequence which is modulated by the QAM method, analog-to-digital converted and transmitted is described below together with the apparatus as shown in FIG. 1.

Analog-to-digital converter 12 samples the demodulated I-channel signal according to the sampling clock which is obtained by the symbol timing recovering apparatus, and generates digital data. Analog-to-digital converter 14 samples the demodulated Q-channel signal according to the sampling clock which is obtained by the symbol timing recovery apparatus, and generates digital data. The analog-to-digital converted I-channel data is supplied to first pre-processing filter 21, and the analog-to-digital converted Q-channel data is supplied to second pre-processing filter 22. First and second pre-processing filters 21 and 22 are narrow-band filters of which the center frequency corresponds to one-half of a symbol rate $f_{SYMBOL}$ (=symbol per second), and which receive the I-channel data and the Q-channel data, pass only the signal components necessary for the symbol timing recovery and remove other signal components, respectively. First and second square calculators 23 and 24 square the output data of first and second pre-processing filters 21 and 22. Adder 25 adds the output data of two square calculators 23 and 24. As a result, the output signal of adder 25 becomes a sinusoidal wave signal which has a frequency obtained by adding a frequency of the direct-current (DC) component to a frequency of the symbol rate $f_{SYMBOL}$. The output signal of adder 25 passes through narrow-band filter 26 having the same center frequency as the symbol rate $f_{SYMBOL}$, and becomes a sinusoidal wave signal having a frequency substantially the same as the symbol rate $f_{SYMBOL}$.

Figure 2:
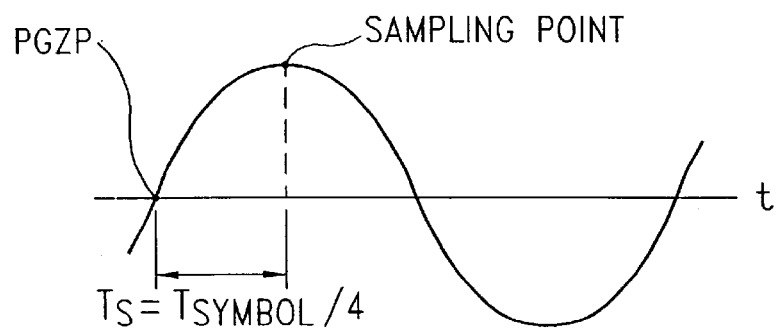
FIG. 2 is a graphical view representing a sinusoidal wave signal which is output from a narrow-band filter.

FIG. 2 shows a sinusoidal wave signal output from narrow-band filter 26. As shown in FIG. 2, an exact sampling point in time required in the receiver to determine the transmitted symbol becomes a point in time beyond a quarter of the symbol timing period $T_{SYMBOL}$ from the PGZP of the sinusoidal wave signal. Thus, it is necessary to exactly detect the PGZP for the symbol timing recovery. As shown in FIG. 2, when sampling period $T_S$ corresponds to a quarter of the symbol timing period $T_{SYMBOL}$, the frequency for sampling the received signal in analog-to-digital converters 12 and 14 should be more than four times symbol rate $f_{SYMBOL}$.

Since distortion of the signal severely occurs in high-speed data transmission, the present invention does not detect the PGZP for every symbol to determine a sampling frequency of the next symbol. Instead, the present invention detects tens of the PGZPs from the symbol sequences which are sampled according to the predetermined sampling frequency, and determines an exact sampling point of time using an average value with respect to the detected tens of the PGZPs. The sampling frequency generated based on the sampling point of time is used for detecting a new average value of the PGZP. In this embodiment, a sampling point of time is corrected one-time for every ten of the symbols in this manner.

Back to the apparatus shown in FIG. 1, average detector 27 receives the sinusoidal wave signal of narrow-band filter 26 and detects the PGZP. If several tens of the PGZPs are detected, average detector 27 calculates an average value of the detected PGZPs, and generates the average PGZP data. Average detector 27 uses the average PGZP data and determines symbol timing period $T_{SYMBOL}$. The determined symbol timing period $T_{SYMBOL}$ is supplied to clock generator 28. Clock generator 28 receives symbol timing period $T_{SYMBOL}$ and determines an exact sampling point of time. That is, clock generator 28 determines a point of time corresponding to a quarter of the symbol timing period $T_{SYMBOL}$ from the average PGZP as a sampling point in time. Clock generator 28 determines an interval between the average PGZP and the sampling point in time as a sampling period, and generates a sampling clock based on the determined sampling point of time and sampling period.

Assuming that a bit rate which is used in the symbol timing recovery apparatus is $Mf_{SYMBOL}$, clock generator 28 is synchronized with symbol timing period $T_{SYMBOL}$ supplied from average detector 27, and generates a sampling clock capable of sampling the received signal in an interval which is obtained by dividing the symbol timing period $T_{SYMBOL}$ into M equi-distance intervals. That is, the frequency of the sampling clock becomes $Mf_s$.

Analog-to-digital converters 12 and 14 convert the analog signals of the respective channels into the digital signals according to the sampling clock of clock generator 28. If the sampling of the signals according to a certain sampling clock of clock generator 28 is accomplished with respect to the several tens of the symbols, a new sampling clock generated by symbols is used for sampling the signal with respect to the next symbols.

If a phase locked loop (PLL) device is additionally inserted between narrow-band filter 26 and average detector 27 in the symbol timing recovery apparatus, a phase of a more exact sampling clock can be obtained. However, in this case, it consumes a relatively large amount of time for initializing the symbol timing recovery apparatus and complicates the circuitry. Also, when the PLL device is not included in the present invention, an equalizer for processing the output signal of the symbol timing recovery apparatus can be installed instead of the PLL device. Particularly, a fractionally spaced equalizer (FSE) can be installed in the present invention to thereby obtain a better effect.

In the embodiment depicted in FIG. 1, both the I-channel and Q-channel signals are used in the symbol timing recovery. However, only one of the I-channel and Q-channel signals need be used for the symbol timing recovery. That is, in the apparatus shown in FIG. 1, a pre-processing filter and a square calculator can be omitted. However, it is noted that using both the I-channel and Q-channel signals can perform the symbol timing recovery more speedily and exactly than using only one of the I-channel and Q-channel signals.

As described above, the symbol timing apparatus according to the present invention can perform symbol timing recovery in a receiver system which performs high-speed data transmission such as a full-digital high-definition television. Particularly, the present invention can be useful in a multi-level and multi-phase modulation method such as the QAM. Also, the structure of the symbol timing recovery and modem portion according to the present invention is entirely applicable to the structures of symbol timing recovery system and modem receiver for a high-speed data modem, in addition to a high-definition television system.

What is claimed is:

1. A symbol timing recovery apparatus for sampling a received signal containing symbols which is received in a receiver of a high-speed data transmission system, and for recovering a symbol timing of the received symbols, said symbol timing apparatus comprising:

means for receiving the signal;

means for generating a sinusoidal wave based on said received signal for recovering the symbol timing;

means for detecting a positive-going zero-crossing point of the sinusoidal wave; and means for generating a sampling clock to sample the received signal based on a plurality of positive-going zero-crossing points detected by said means for detecting a positive-going zero-crossing point.

2. A symbol timing recovery apparatus according to claim 1, wherein said means for generating a sinusoidal wave comprises:

a pre-processing filter means for receiving the sampled signal and narrow-bandpass-filtering the received signal and outputting a narrow-band signal;

a square calculating means for receiving the output of said pre-processing filter means and performing a square calculation operation;

a narrow-band filter for receiving an output signal of said square calculating means and narrow-band-pass-filtering the received signal to generate an output having a center frequency corresponding to a symbol rate; and an average positive-going zero-crossing point detector for receiving the output of said narrow-band filter and calculating an average value of a plurality of the positive-going zero-crossing points.

3. A symbol timing recovery apparatus according to claim 2, wherein said pre-processing filter means filters the sampled signal, wherein said pre-processing filter has a center frequency being one-half of the symbol rate.

4. A symbol timing recovery apparatus according to claim 2, wherein said pre-processing filter means comprises:

a first pre-processing filter for receiving an I-channel signal among the received signal and filtering the received I-channel signal into a first narrow-band signal having a center frequency being one-half of the symbol rate; and a second pre-processing filter for receiving a Q-channel signal among the received signal and filtering the received Q-channel signal into a second narrow-band signal having a center frequency being one-half of the symbol rate.

5. A symbol timing recovery apparatus according to claim 4, wherein said square calculating means comprises:

a first square calculator for squaring the output of said first pre-processing filter; and a second square calculator for squaring the output of said second pre-processing filter.

6. A symbol timing recovery apparatus according to claim 5, further comprising an adder for adding the output of said first square calculator to the output of said second square calculator and supplying the added signal to said narrow-band filter.

7. A symbol timing recovery apparatus according to claim 6, wherein said average positive-going zero-crossing point detector comprises:

means for detecting a positive-going zero-crossing point and a symbol timing period from the signal supplied from said narrow-band filter; and means for averaging the detected positive-going zero-crossing point and symbol timing period with respect to a plurality of the symbols, calculating an average positive-going zero-crossing point and a sampling point in time and supplying the calculated result to said means for generating a sampling clock.

8. A symbol timing recovery apparatus according to claim 7, wherein said means for generating a sampling clock determines a sampling interval based on the received average positive-going zero-crossing point and the sampling point in time.

9. A symbol timing recovery apparatus for sampling a received signal containing symbols which is received in a receiver of a high-speed data transmission system, and recovering a symbol timing of the received symbols, said symbol timing apparatus comprising:

a receiver for receiving the signal;

a generator for generating a sinusoidal wave based on the received signal for recovering the symbol timing;

a detector for detecting a positive-going zero-crossing point of the sinusoidal wave; and a sample clock generator for generating a sampling clock to sample the received signal based on a plurality of positive-going zero-crossing points detected by said detector.

10. A symbol timing recovery apparatus according to claim 9, wherein said means for generating a sinusoidal wave comprises:

a pre-processing filter unit for receiving the sampled signal, narrow-bandpass-filtering the received signal and outputting a narrow-band signal;

a square calculating unit for receiving the output of said pre-processing filter unit and performing a square calculation operation;

a narrow-band filter for receiving an output signal of said square calculator unit and narrow-band-pass-filtering the received signal to generate an output having a center frequency corresponding to a symbol rate; and an average positive-going zero-crossing point detector for receiving the output of said narrow-band filter and calculating an average value of a plurality of the positive-going zero-crossing points.

11. A symbol timing recovery apparatus according to claim 10, wherein said pre-processing filter unit filters the sampled signal, wherein said pre-processing filter unit has a center frequency being one-half of the symbol rate.

12. A symbol timing recovery apparatus according to claim 10, wherein said pre-processing filter unit comprises:

a first pre-processing filter for receiving an I-channel signal among the received signal and filtering the received I-channel signal into a first narrow-band signal having a center frequency being one-half of the symbol rate; and a second pre-processing filter for receiving a Q-channel signal among the received signal and filtering the received Q-channel signal into a second narrow-band signal having a center frequency being one-half of the symbol rate.

13. A symbol timing recovery apparatus according to claim 12, wherein said square calculator unit comprises:

a first square calculator for squaring the output of said first pre-processing filter; and a second square calculator for squaring the output of said second pre-processing filter.

14. A symbol timing recovery apparatus according to claim 13, further comprising an adder for adding the output of said first square calculator to the output of said second square calculator and supplying the added signal to said narrow-band filter.

15. A symbol timing recovery apparatus according to claim 14, wherein said average positive-going zero-crossing point detector comprises:

a detector for detecting a positive-going zero-crossing point and a symbol timing period from the signal supplied from said narrow-band filter; and an averager for averaging the detected positive-going zero-crossing point and symbol timing period with respect to a plurality of the symbols, calculating an average positive-going zero-crossing point and a sampling point in time and supplying the calculated result to said means for generating a sampling clock.

16. A symbol timing recovery apparatus according to claim 15, wherein said generator for generating a sampling clock determines a sampling interval based on the received average positive-going zero-crossing point and the sampling point in time.

* * * * *